Wernher von Braun,
INVENTOR.

Wernher von Braun,
INVENTOR.

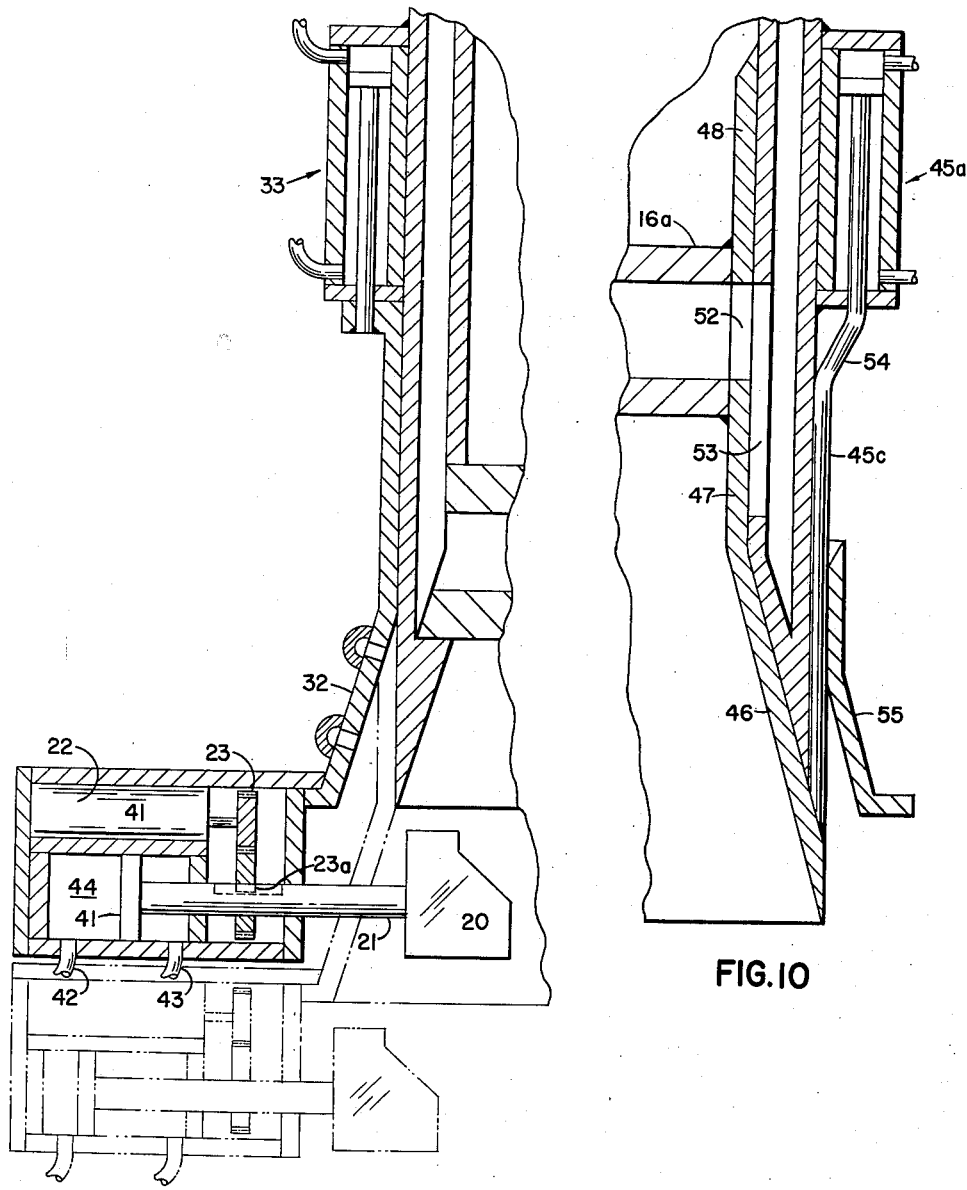

Jan. 10, 1961

W. VON BRAUN 2,967,393

ROCKET-PROPELLED MISSILE

Filed Dec. 3, 1959

Wernher von Braun,
INVENTOR.

BY S. J. Rotondi,
A. T. Dupont,
V. L. Billings, and
Alvin E. Moore,
ATTORNEYS.

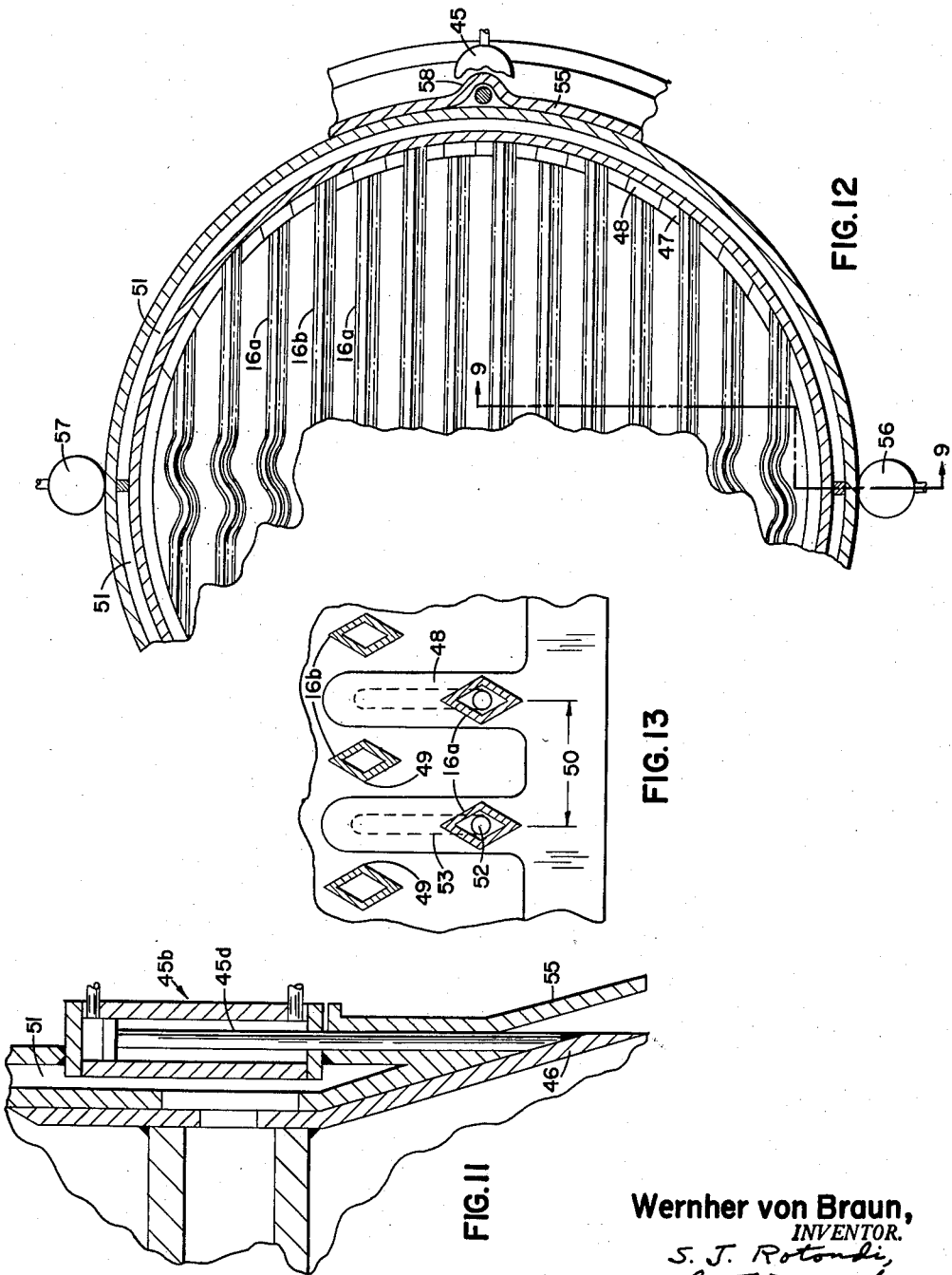

United States Patent Office 2,967,393
Patented Jan. 10, 1961

2,967,393
ROCKET-PROPELLED MISSILE

Wernher von Braun, Huntsville, Ala., assignor to the United States of America as represented by the Secretary of the Army Filed Dec. 3, 1959, Ser. No. 857,237

10 Claims. (Cl. 60—35.6)

(Granted under Title 35, U.S. Code (1952), sec. 266)

The invention described herein may be manufactured and used by or for the Government for governmental purposes without the payment of any royalty thereon.

This invention relates to a rocket-propelled missile. It comprises a missile shell having a relatively blunt after end and an axially short rocket motor, that may be utilized with solid propellant, but is especially advantageous when used with liquid fuel.

The increasingly large power and high combustion-chamber pressure of rocket motors have intensified the problem of securing a high mass ratio in space vehicles. This ratio is between the full weight and the empty weight of the missile and thus is between: (1) the weight of the missile shell, payload, rocket motor and fuel; and (2) the weight of the above entities minus that of the fuel. Since the fuel and payload should be as heavy as possible for a given missile size, the shell and motor weights are the factors that may be reduced.

Parts of these two factors are interrelated. Although the diameter of the fuel-area portion of a shell is determined by overall design considerations and is somewhat independent of the motor, the after portion of a shell which houses a conventional rocket motor is greatly affected by the length of the motor. This length is a substantial portion of the missile due to the long, frusto-conical flare of the outlet of the conventional nozzle. The opening angle of this outlet, from the nozzle's throat to its mouth, should be no larger than fifteen to twenty degrees, to avoid thrust losses due to lateral components of the exhaust-gas speed vector; therefore, the conventional nozzle occupies a large portion of the highly valuable interior space of the missile, and, due to its weight adversely limits the mass-ratio of the missile. In high-powered space vehicles, which have very long nozzles, this limitation has become a great handicap to efficiency.

Another problem in the missile art is the achievement of variable thrust from a rocket motor without variation of its fuel supply and combustion. Such achievement is of especial importance in the controlled variation of thrust from solid propellants.

In view of the above facts, an object of this invention is to provide a rocket-propelled missile or other space vehicle which has a high mass-ratio.

Another object of the invention is to provide a rocket-propelled missile comprising a motor that has a short nozzle and therefore is of short axial extent, whereby more space within the missile shell is available for the fuel tanks.

A further object of the invention is to provide a largely cylindrical missile having a blunt stern and a rocket motor nozzle that, at each of its cross-sectional planes, occupies and produces thrust in substantially all the space within the cross-section of the missile shell.

Another object is to provide a rocket motor having a combustion chamber and a nozzle portion that have cylindrical walls or perimeters of substantially equal diameters, said nozzle portion comprising thrust-producing bars or tubes that extend across the circular space within its wall.

A further object is to devise a rocket motor of the type set forth above which has interiorly cooled, thrust-producing nozzle tubes or vanes.

Still another object is to provide a missile having a generally cylindrical, axially short rocket motor, comprising means for flight control of the vehicle and means for variation of the expansion ratio of the motor, both means being actuatable by a conventional missile guidance system.

The foregoing and other objects will become more fully apparent from the following detailed description of exemplary structure embodying the invention and from the accompanying drawings, in which:

Figure 7 is a detail, sectional view of a second form of the assembly of a combustion chamber, nozzle tubes and extensible skirt.

Figure 10 is a detail, sectional view of part of the structure of Figure 9, showing one form of the nozzle-tube adjusting motor.

Figure 11 is a detail, sectional view, showing another form of the nozzle-tube adjusting motor.

Figure 12 is a sectional view taken from the plane 12—12 of Figure 9.

Figure 13 is a detail sectional view, showing the adjustable nozzle tubes in their extreme, rearward position.

Figure 1:
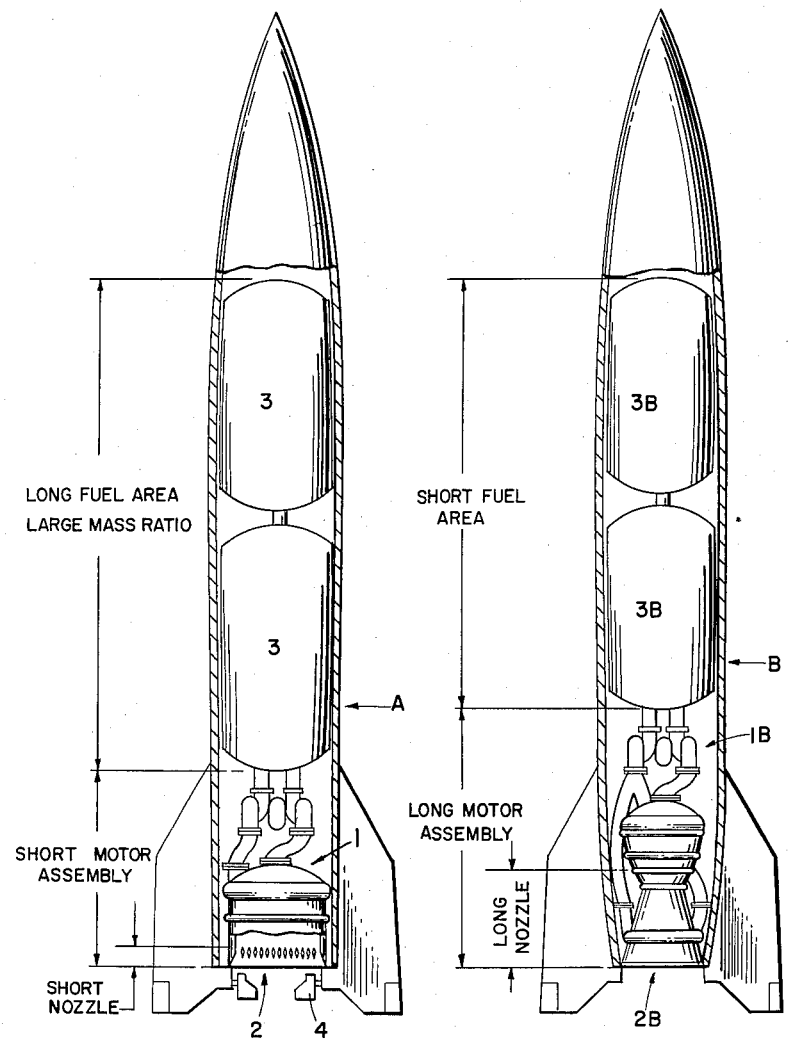
Figure 1 is a semi-schematic, elevational view of two missiles of equal lengths, the outer shells of which have been partly broken away, showing the manner in which the short nozzle assembly of this invention provides a high mass-ratio.
Figure 2:
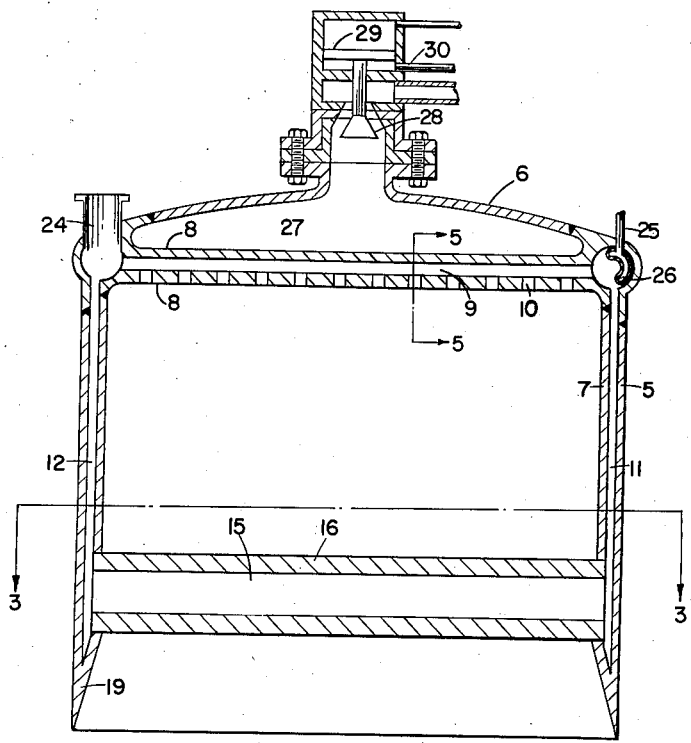
Figure 2 is a detail, sectional view of one form of the rocket motor assembly.

In Figure 1 the missile A of this invention is shown as comprising: a rocket motor assembly, 1, of short axial extent, including an axially short nozzle assembly 2; and a relatively long fuel-storage portion, comprising tanks 3. The sizes of these elements may be compared with those of the conventional missile B, which is of the same length as missile A, but has a conventional rocket motor nozzle 2B that is considerably longer than nozzle 2, and has frusto-conical portions whose shape requires a relatively large amount of space at the stern of the missile which is not utilized in producing thrust. Having this long, space-consuming nozzle, the motor assembly 1B is relatively long—that is, many yards long in larger conventional missiles. Thus the fuel-storage portion (comprising tanks 3B) is relatively short; and missile B consequently has a low mass ratio, in comparison with missile A.

As part of missile A, pivoted control vanes of carbon or other heat-resistant material, of the type shown schematically at 4, optionally may be used.

Figure 3:
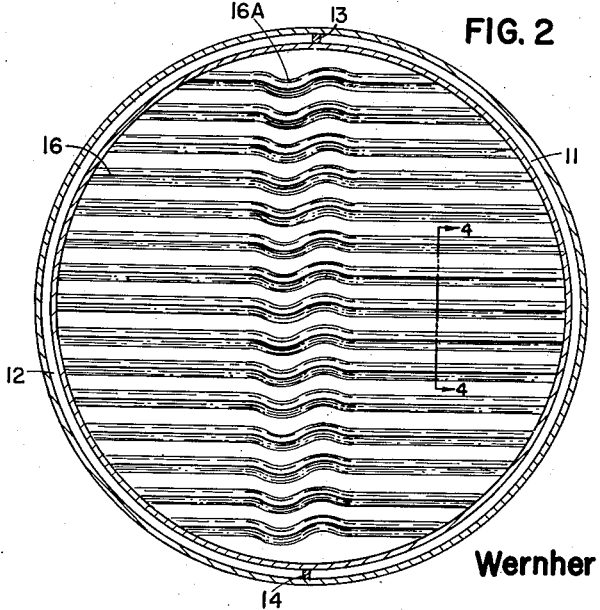
Figure 3 is a sectional view from the plane 3—3 of Figure 2.

The form of the rocket motor and exhaust control vane assembly shown in Figures 2 to 5 has a substantially or nearly cylindrical configuration, so that there is little wasted space within its outer housing 5, or within the rocket-motor portion of the missile shell. Fixed to this outer housing, by welding or the like, there are a cover plate 6 and an inner housing or casing 7. A fuel spray plate 8, fixed between the cover plate and casing 7, is provided with interconnecting channels 9 and 10 which provide communication between space 11 (between casings 5 and 7) and the combustion space within casing 7. As shown in Figure 3, space 11 is semi-cylindrical, and is separated from a complementary semi-cylindrical space, 12, by dividing walls 13 and 14. These spaces are in communication via passages 15 in nozzle bars or tubes 16.

Tubes 16 have arcs 16A which permit safe expansion or contraction with changes of temperature. Both the straight and curved portions of the tubes are shown as diamond-shaped in cross section and are spaced from each other, according to engineering calculations, by an amount sufficient to provide the proper nozzle throat area 17 and mouth area 18. In lieu of the diamond shape, the tubes may be curved, for example, in the cross-sectional form of a lens, to provide the required throat and mouth areas. The gaseous expansion that occurs in the rocket motor is dependent on the total nozzle mouth area (the sum of areas 18) relative to the total throat area (the sum of areas 17).

The combustion chamber that is formed by and between casing 7, spray plate 8 and nozzle bars 16 preferably is substantially cylindrical, and is integral or otherwise fixed to annular nozzle portion 19, by means of which the combustion gases ejected from the mouths between nozzle bars 16 may be further expanded.

In the exhaust from nozzle annulus 19 vanes of carbon or other material of a high melting point may be positioned. In some uses of the invention, however, these vanes and their operating mechanism may be eliminated. As shown in Figure 7, vanes 20 may be rotated, for control of the attitude of the missile, by means of shaft 21, to which they are fixed. Shaft 21 may be rotated by reversible electric motor 22, which drives gearing 23. This motor may be actuated for steering the missile as a result of receiving a signal from the missile guidance system, indicated in Figure 8, or (in a passenger-carrying space craft) of action by a pilot.

Nozzle bars 16 are cooled by liquid fuel or other coolant which is pumped to the rocket motor assembly thru pipe 24 and is conducted thru space 12 to passages 15. In some uses of the rocket motor nozzle, for example, with monopropellants or solid propellants, this coolant would be a separate fluid, and would be conducted from space 11 back to the pump, but in the embodiment shown in Figure 2 the coolant is one of two bipropellant components (for example, alcohol), and is supplied to spray plate bores 9. This supply may be shut off by the supply of fluid under pressure thru conduit 25 and into semi-annular synthetic rubber or plastic hose 26. The supply of pressurized fluid may be automatically controlled by the guidance system, or, alternatively, by an operator aboard the vehicle. This pressurized fluid forces inward the inner wall of the hose, thus closing communication between space 11 and bores 9.

The other component of the bipropellant is supplied to space 27, thru valve 28, which preferably is operated simultaneously with valve element 26, for example by means of piston 29 actuated by pressurized fluid from conduit 30. From space 27 the second fuel component is atomized as it is supplied to the combustion chamber thru small bores 31 of spray plate 8 (shown in Figure 5).

Figure 6:
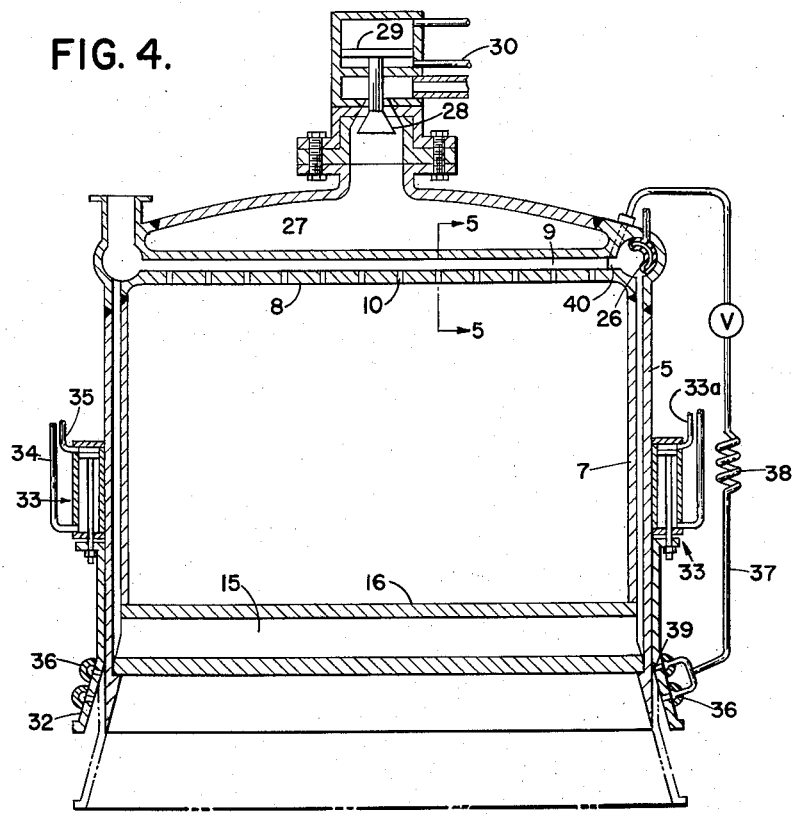
Figure 6 is a detail, sectional view of the rocket motor assembly of Figure 2, with the addition of an auxiliary, extensible expansion cone.
Figure 8:
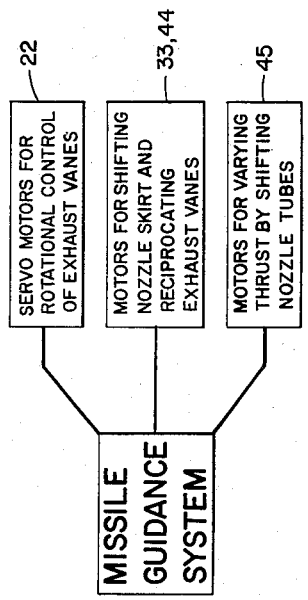
Figure 8 is a block diagram indicating the manner in which the control motors for varying the positions of the steering vanes, the extendible nozzle come and/or the shiftable nozzle vanes may be actuated by a missile guidance system.

In the form of the invention shown in Figure 6 the rocket motor comprises an auxiliary, retractable nozzle portion or skirt 32. This extendible skirt constitutes a means for increasing the expansion ratio of the rocket motor with increasing flight altitude. Such an increase is desirable because the range of expansion of the propulsive gases is limited by the ambient, back pressure on the motor, and this back pressure from the atomsphere is decreased with increasing altitude. Skirt 32 may be controlled, as indicated in Figure 8, from the missile guidance system.

The skirt, as shown in Figure 6, is reciprocatable on housing 5 by double-acting fluid motors 33 which are flow-connected to a source of pressurized fluid by conduits 34 and 35. When the vehicle reaches a predetermined altitude, the guidance system, in a known manner, controls valves to send pressurized fluid through the conduits to force skirt 32 into the dotted-line position shown in Figure 6. In lieu of utilizing the computer of the guidance system, control of motors 33 may be achieved by any known means of fluid control—for example, by barometer-operated or hand-operated valves. The control may comprise only one quick movement of the skirt, at a certain altitude, from the full-line to the dotted-line position, or a slowly progressive movement, with different nozzle settings at different altitudes. In lieu of the double-acting motors, one or more single-acting fluid motors or electric motors may be utilized.

Since the lower part of any nozzle is subject to relatively low heat, a film-cooling means is relied on to cool the extendible skirt. This means comprises coolant-distributing rings 36 which receive cooling fluid from conduit 37, and which supply the fluid thru holes 39 to the inside nozzle surface. Conduit 37, which has a flexible, extendible portion 38, may be connected to any source of coolant, and in the form of the invention shown in Figure 6 is connected via a valve to the inlet 40 of one of bores 9, which is closable by hose 26. This valve is automatically opened, in a known manner, by pressurized fluid in or bypassed from conduit 33a as this conduit supplies fluid to motor 33. Thus, when motor 33 is energized in response to a signal from the guidance system, and it moves and holds skirt 32 in any desired, extended position, cooling fluid is supplied to ports 39.

The structure of Figure 7 comprises heat-resistant vanes 20 which may be both rotated and reciprocated. To prevent vane shaft 21 from being unduly exposed to the motor's exhaust, it is attached to piston 41 of a fluid motor that receives pressurized fluid via conduits 42 and 43. Since piston 41 is round it may be rotated by gears 23, and such rotation does not affect its reciprocation by the fluid motor. Also, reciprocation of shaft 21 does not bind gearing 23 due to the fact that the shaft has an elongated recess which may slide relative to spline 23a that drivingly connects gearing 23 to the shaft. This reciprocation occurs at the same time that motor 33 is actuated. Motors 33 and 44 are simultaneously energized in response to a signal from the guidance system.

In the structure of Figures 9 to 12 both the throat area and the mouth area of the nozzle tube assembly may be varied. This is achieved by shifting every other one of the nozzle tubes by means of fluid motors 45 (only one of which is shown in Figures 10, 11 and 12).

Figure 4:
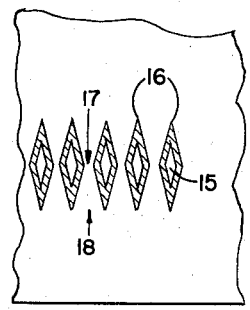
Figure 4 is a detail, sectional view, taken from the plane 4—4 of Figure 3, showing part of the rocket motor as broken away.
Figure 5:
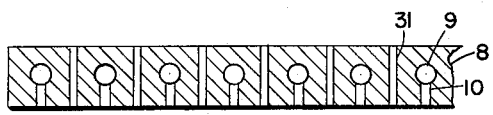
Figure 5 is a detail, sectional view from the plane 5—5, of Figures 2 and 6.
Figure 9:
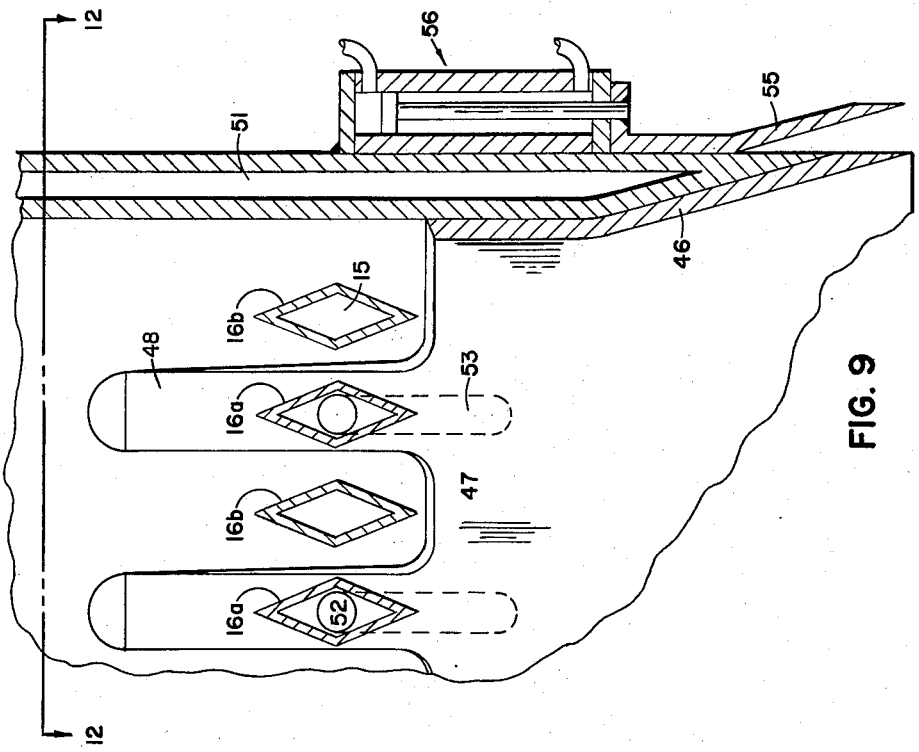
Figure 9 is a detail, sectional view (from the plane 9—9 of Figure 12) of a third form of the assembly of a combustion chamber, tubes and skirt.

Alternative types of these motors and their supports are shown in Figures 9 and 10 at 45a and 45b. The cylinder of motor 45a is welded to the outside of the coolant casing, whereas the cylinder of motor 45b is welded to the edges of an opening cut in the outer wall of the coolant casing. Each motor is rigidly connected by a rod (45c or 45d) to an expansion cone, 46. Cone 46 is integral with band 47 and sealing plates 48. Band 47 supports and is fixed to the ends of every other one of the nozzle tubes, 16a. Thus, when motors 45 (45a or 45b) are moved rearwardly in response to the operation of a control valve by a signal from the guidance system (or by a pilot), band 47 shifts alternate nozzle tubes from their position indicated in Figure 4 toward their position in Figure 13. If the desired shift is to the extreme position in Figure 13 the throat area of the nozzle-tube assembly considerably increases, from the sum of the areas indicated at 17 in Figure 4 to the sum of the areas between edges 49 in Figure 13. At the same time the total mouth area of the nozzle-tube assembly remains the same, for the sum of areas 18 in Figure 4 is substantially the same as the sum of the areas indicated at 50 in Figure 13. Thus the thrust is considerably reduced. Any adjusted position of the movable tubes between the extremes indicated in Figures 4 and 13 would involve a smaller reduction of the thrust. This control of the thrust may be without change of the rate of combustion, and thus may be used with advantage not only with liquid propellant, but also with solid propellant, whose rate of combustion is not easily controlled. Some examples of such use are: (1) in the control of thrust just before launching; and (2) while the missile is in flight, and has moved to a point above its desired trajectory, in the controlled reduction of its thrust for a period, to bring the vehicle back on its trajectory.

Each of tubes 16a is welded at each of its ends to one of sealing plates 48, and the hollow space of the tube has access at each of its ends, to one of the coolant chambers, 51, via opening 52 in the plate and slot 53 in the inside wall of the chamber. This wall is rigid with fixed tubes 16b. Thus, as is indicated in Figure 13, when tubes 16a are moved aft, relative to said wall and fixed tubes, plates 48 continue to seal slot 53 against escape of the propulsive fluid into the coolant chambers.

This control of the propulsive thrust may be used either with or without an extensible nozzle skirt around chambers 51. If such a skirt is not utilized, the angled portion, 54, of connecting rod 45c optionally may be eliminated, cone 46 may be widened into a wider mouth than is shown in Figure 10, and the straight rod welded to the widened portion of the cone.

An extensible skirt is shown in Figures 9 to 12 at 55. It is extendible, in response to a signal from the guidance system, by a pair of double-acting motors, 56 and 57. The skirt is provided with corrugations 58 to prevent its interference with the operation of motors 45.

Figure 8 indicates how the structure of Figures 9 to 13 is used in various controls of the thrust and steering of a space vehicle. In response to a signal from the guidance system, the missile may be steered by actuation of motors 22, thus rotating the carbon vanes in the exhaust. Either with or without this rotation of the steering vanes, motors 33 and 44 may be actuated, in response to a second type of signal from the guidance system, to extend the auxiliary nozzle cone, and thus increase the thrust at higher altitudes. And in response to a third type of signal from the guidance system, motors 45 may be actuated, to shift alternate nozzle vanes, thus varying the thrust from the nozzle-vane part of the rocket motor.

The invention comprehends various obvious changes in structure from that herein illustrated, within the scope of the subjoined claims.

The following invention is claimed:

1. A missile having a high mass ratio, comprising an elongated shell that is substantially cylindrical over most of its length, has a fuel-storage portion, and terminates in a rocket-motor portion whose after end has a diameter approximating in size the maximum diameter of the shell, and a rocket-motor assembly housed within said rocket-motor shell portion, said motor assembly comprising: a generally cylindrical combustion chamber, having outer and inner walls, a space therebetween and a pair of diametrically-located partitions joining said walls and dividing said space into two coolant chambers; a nozzle assembly attached to and opening to the after end of said combustion chamber, having an outer wall that is of substantially the same diameter as and is fixed to said combustion-chamber outer wall, having an inner wall that is of substantially the same diameter as and is fixed to said combustion-chamber inner wall, and further comprising substantially parallel, hollow, bar-like vanes that extend transversely across the mouth of said chamber and are of a configuration to provide a nozzle for rocket-motor gases between each pair of parallel vanes, each of said channels having a narrow, nozzle-throat portion between its inlet at said chamber and its nozzle-mouth portion at the after end of the rocket motor, said nozzle vanes and channels occupying and producing thrust in substantially all of the space within said nozzle-assembly inner wall; means for supplying a coolant to one of said two coolant chambers, and thru said hollow vanes into the other one of said coolant chambers; and means to provide an outlet for said coolant from said other one of said coolant chambers.

2. A rocket motor assembly comprising: a combustion chamber having spaced outer and inner walls, that are generally cylindrical over substantially the whole of its axial extent, partitions in the cylindrical space between said walls dividing said space into two semi-cylindrical spaces, and a liquid-fuel spray plate at the chamber's forward end; a rocket nozzle assembly comprising spaced, generally cylindrical outer and inner walls that are integral with and are, respectively, of the same diameters as said combustion-chamber outer and inner walls, and comprising parallel, hollow nozzle bars, extending transversely across and attached to said inner wall of the nozzle assembly, with the hollow space in each of said bars being in communication with each of said semi-cylindrical spaces, said bars being constructed and arranged to provide a plurality of nozzle channels for propulsive gases from said chamber, said bars and channels forming a grating of uniformly spaced nozzle bars across the whole of the mouth of said generally cylindrical combustion chamber, said nozzle assembly further comprising an annular, divergent, aft-flaring nozzle ring that is fixed to the after ends of said spaced nozzle-assembly walls, said ring further expanding the combustion gases that are ejected from said nozzle channels; means for supplying one of two bipropellant liquids to and thru said spray plate; means for supplying the second of said bipropellant liquids, as a coolant, to one of said semi-cylindrical spaces, and then thru the hollow spaces in said bars to the second of said semi-cylindrical spaces; and means to conduct said second bipropellant liquid from said second semicylindrical space to and thru said spray plate.

3. A device as set forth in claim 1, which further comprises: attitude control vanes of a heat-resistant material, exposed to said gases; a control shaft for each of said vanes, drivably connected to its associated vane; means supported by said combustion chamber for rotatably supporting said shaft; and control means supported by said combustion chamber for rotating said shaft.

4. A device as set forth in claim 1, in which a plurality of said nozzle vanes are fixed to said combustion chamber, and at least one of said nozzle vanes is reciprocatable aft along the axis of said combustion chamber, said device further comprising motor means for reciprocating said reciprocatable vane.

5. A device as set forth in claim 1, in which a plurality of said nozzle vanes are fixed to said combustion chamber, and a plurality of said nozzle vanes are movable aft along the axis of said combustion chamber, said fixed and movable vanes being alternately arranged, said device further comprising motor means for reciprocating said movable vanes.

6. A device as set forth in claim 1, in which said nozzle assembly further comprises a nozzle ring fixed to the after end of said combustion chamber and having an aft-flaring inner nozzle surface and an outer surface of substantially the shape and cross-sectional size of the outer surface of said chamber.

7. A device as set forth in claim 1, in which said nozzle assembly further comprises a metallic skirt having an internal, frusto-conical surface, constituting an auxiliary nozzle portion, said skirt being slidably mounted relative to said combustion chamber, for reciprocation from a position in which said auxiliary nozzle portion is outside the expanding path of the motor's propulsive gases to a position in which said nozzle portion is in said path.

8. A space vehicle as set forth in claim 1, in which said nozzle assembly further comprises a metallic skirt having a forward, inner wall that is slidable on the outer surface of said combustion chamber and an after frustoconical inner surface that provides an auxiliary rocket nozzle portion, said skirt being slidable from a point where said auxiliary nozzle portion is out of the rocket-gas stream to a point where said nozzle portion is in said stream, said vehicle further comprising motor means supported by said combustion chamber, and power-transmission means connecting said motor means and said skirt, whereby in the upper atmosphere said skirt may be moved aft, so that its auxiliary nozzle portion is in the path of the propulsive gases.

9. A vehicle as set forth in claim 8, in which said skirt has holes from its outer surface to its inner surface; said vehicle further comprising means for supplying coolant to said holes.

10. A vehicle as set forth in claim 9, which further comprises: attitude control vanes of a heat-resistant material, exposed to said gases; a control shaft for each of said vanes, drivably connected to its associated vane; means attached to said nozzle housing for rotatably and slidably supporting said vane shaft; motor means supported by said nozzle housing; power-transmission means connecting said motor means and shaft for rotating the shaft, said power-transmission means being constructed and arranged to permit said shaft to be reciprocated; and means supported by said nozzle housing for reciprocating said shaft whereby, when said skirt is reciprocated aft on said nozzle assembly, thus placing said auxiliary nozzle portion in the path of said propulsive gases, said rotatable control vanes may be withdrawn into the outer portion of said path.

References Cited in the file of this patent

UNITED STATES PATENTS

| | | |
|---|---|---|
| 2,694,898 | Stauff | Nov. 23, 1954 |
| 2,744,380 | McMillan et al. | May 8, 1956 |
| 2,788,635 | Ford | Apr. 16, 1957 |
| 2,847,822 | Hausmann | Aug. 19, 1958 |
| 2,850,977 | Pollak | Sept. 9, 1958 |

FOREIGN PATENTS

| | | |
|---|---|---|
| 1,066,499 | France | Jan. 20, 1954 |
| 792,831 | Great Britain | Apr. 2, 1958 |
| 796,291 | Great Britain | June 11, 1958 |
| 809,844 | Great Britain | Mar. 4, 1959 |

OTHER REFERENCES

Chandler: "Anti-Bomber Rocket Missiles," Aero Digest, vol. 60, November 4, pages 100–102, April 1950.

Stambler: "Small Engines Key to ICBM Accuracy," Space/Aeronautics, pages 30–31, October 1958.